(12) United States Patent
Black et al.

(10) Patent No.: US 8,171,544 B2
(45) Date of Patent: May 1, 2012

(54) METHOD AND SYSTEM FOR PREVENTING, AUDITING AND TRENDING UNAUTHORIZED TRAFFIC IN NETWORK SYSTEMS

(75) Inventors: Robert Barth Black, Austin, TX (US); Steven Richard Wright, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 1608 days.

(21) Appl. No.: 11/110,247

(22) Filed: Apr. 20, 2005

(65) Prior Publication Data

US 2006/0242701 A1  Oct. 26, 2006

(51) Int. Cl.
*G06F 11/00* (2006.01)
(52) U.S. Cl. .......................................................... 726/22
(58) Field of Classification Search ..................... 726/22
See application file for complete search history.

(56) References Cited

U.S. PATENT DOCUMENTS

2003/0217283 A1* 11/2003 Hrastar et al. ................ 713/200

FOREIGN PATENT DOCUMENTS

WO  WO 01/71499 A1  9/2001

* cited by examiner

*Primary Examiner* — Jacob Lipman
(74) *Attorney, Agent, or Firm* — Fish & Richardson P.C.

(57) ABSTRACT

A method and system for preventing, auditing and trending unauthorized traffic in a network system is provided. The unauthorized traffic is detected at the router level. An attacker transmits an attack vector to the network system. The attack vector is detected at the router and signatures are created for network system resources, wherein each signature represents the response of a network system resource to the attack vector. Signatures are created by learning how the attack is taking place within the network system. Network system resources corresponding to the signatures are then emulated, thereby protecting the network device.

15 Claims, 8 Drawing Sheets

METHOD AND SYSTEM FOR PREVENTING, AUDITING AND TRENDING UNAUTHORIZED TRAFFIC IN NETWORK SYSTEMS

BACKGROUND OF THE INVENTION

1. Field of Invention

The embodiments of the invention relate in general to network security. More specifically, the embodiments of the invention relate to a method and system for preventing, auditing and trending unauthorized traffic in a network system.

2. Description of the Background Art

Over the past few years, network security has become a top priority for network and system administrators. Intruders constantly attack network systems by exposing vulnerable services, transmitting worms, viruses, corrupted files, etc. These exploits, worms and viruses affect the functionality of network system resources and services and are generally referred to as attack vectors. An attack vector can be specific to a particular network system resource, or it can affect multiple network system resources at the same time.

Security patches, network firewalls and intrusion detection systems are generally used to safeguard network system resources from attack vectors. A method of preventing attack vectors is with the use of a honeypot. A honeypot is an information system resource. Any interaction with honeypots indicates unauthorized or malicious activity. Honeypots emulate network system resources and services, thereby protecting the network system. Honeypots can track and capture the activity that directly interacts with them. Honeypots are part of the individualized hardware that runs the network device. Hence, if the attack vector affects multiple network devices in the network system at the same time, then multiple honeypots must be configured in all the network devices, with a honeypot being configured and maintained for each network device. Further, every time the attack vector attacks the network system, all the network system resources and services are emulated by multiple honeypots, which reduces its efficiency.

DETAILED DESCRIPTION OF EMBODIMENTS OF THE INVENTION

Various embodiments of the invention provide a method, a system, an apparatus and a machine-readable medium for preventing, auditing and trending unauthorized traffic in a network system. The unauthorized traffic can be in the form of worms, corrupted files, etc. The unauthorized traffic is referred to as an attack vector. The attack vector can be specific to a network device or can affect multiple network devices. Various embodiments of the invention detect the unauthorized traffic at the router level and emulate network system resources and services, thereby preventing the unauthorized traffic from affecting the functionality of the network devices. The method involves emulating the functionality of a known attacker by using a signature system of record. The signature system of record records the port behavior of a given network system resource system and/or service, then mimics that functionality in a stream replay (with respective stream data updated.) For unknown attackers, a learning phase is used to generate a new signature and record the sequence of events initiated by the current unknown activity. Further, in an embodiment of the invention, a session level auditing is also performed to understand the network traffic and accordingly identify security vulnerabilities on the network system and check for potential methods that an intruder might use to attack the network system resources.

Figure 1:
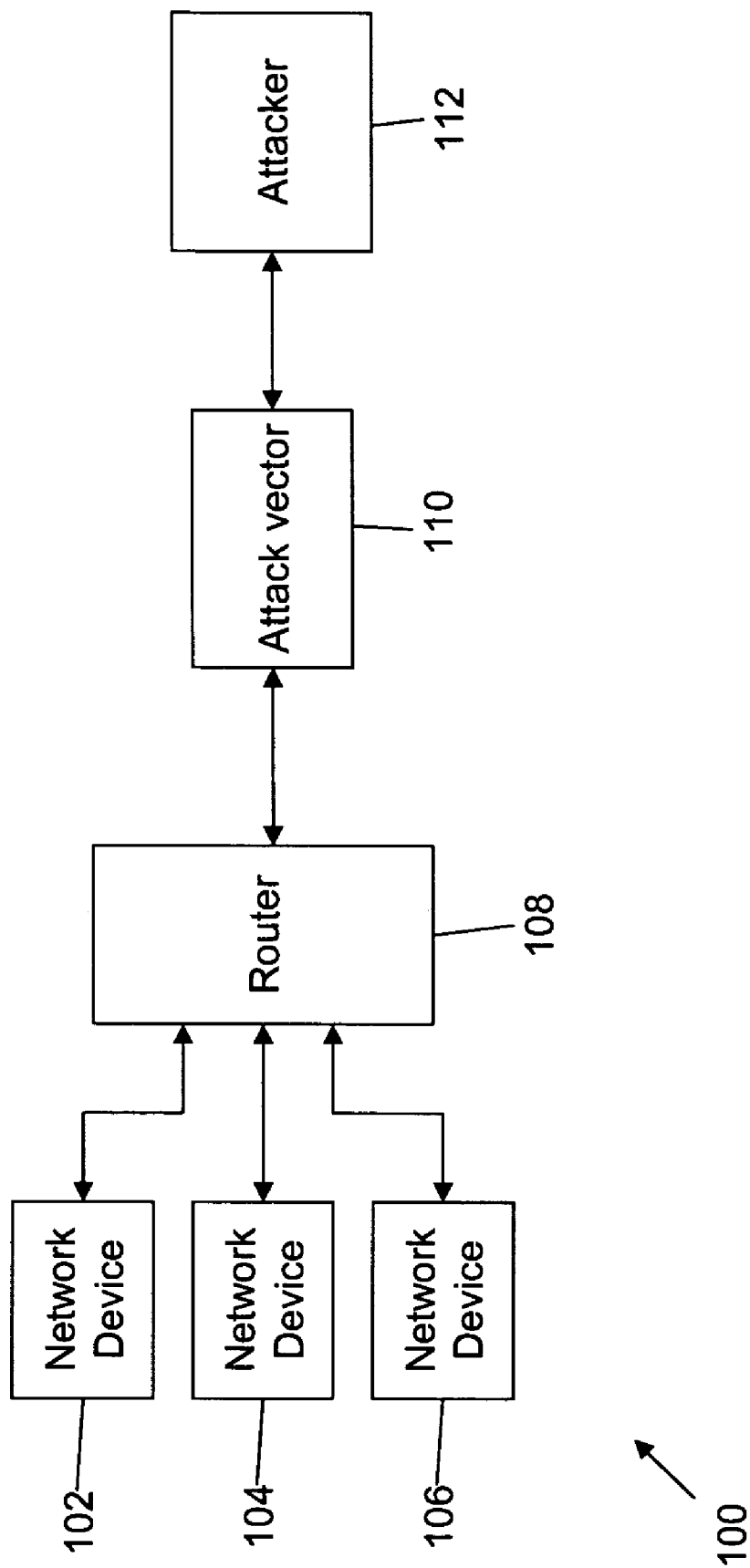
FIG. 1 illustrates a network system in which an exemplary embodiment of the present invention can be practiced.

FIG. 1 depicts a network system 100, in which an exemplary embodiment of the present invention can be practiced. Network system 100 includes a plurality of network devices, hereinafter referred to as network devices 102, 104 and 106, and a router 108. Examples of network devices include, but are not limited to, a general-purpose computer, a mainframe computer, and a data server. Router 108 receives data packets from another network system. Router 108 then transmits the data packets to the respective network devices 102, 104 and 106. Examples of a router include a switch, a relay, etc. Examples of network system include a local area network (LAN), wide area network (WAN), virtual area network (VLAN) and the like.

An attack vector 110 is transmitted by an attacker 112 to router 108, to affect network devices 102, 104 and 106. An attack vector is a means of invading network devices. Some attack vectors are specific to certain network resources on network devices, and others can affect network resources on multiple network devices in the network system. Examples of attack vectors include, but are not limited to exposing network resource flaws, worms, corrupted files, malicious macros, websites, and spam. Attacker 112 can be a network device operating in another network system or a software program running on the network device. Depending on the Internet Protocol (IP) address in the header of attack vector 110, router 108 transmits attack vector 110 to all network devices 102, 104 and 106, or to a specific network device in network system 100.

Figure 2:
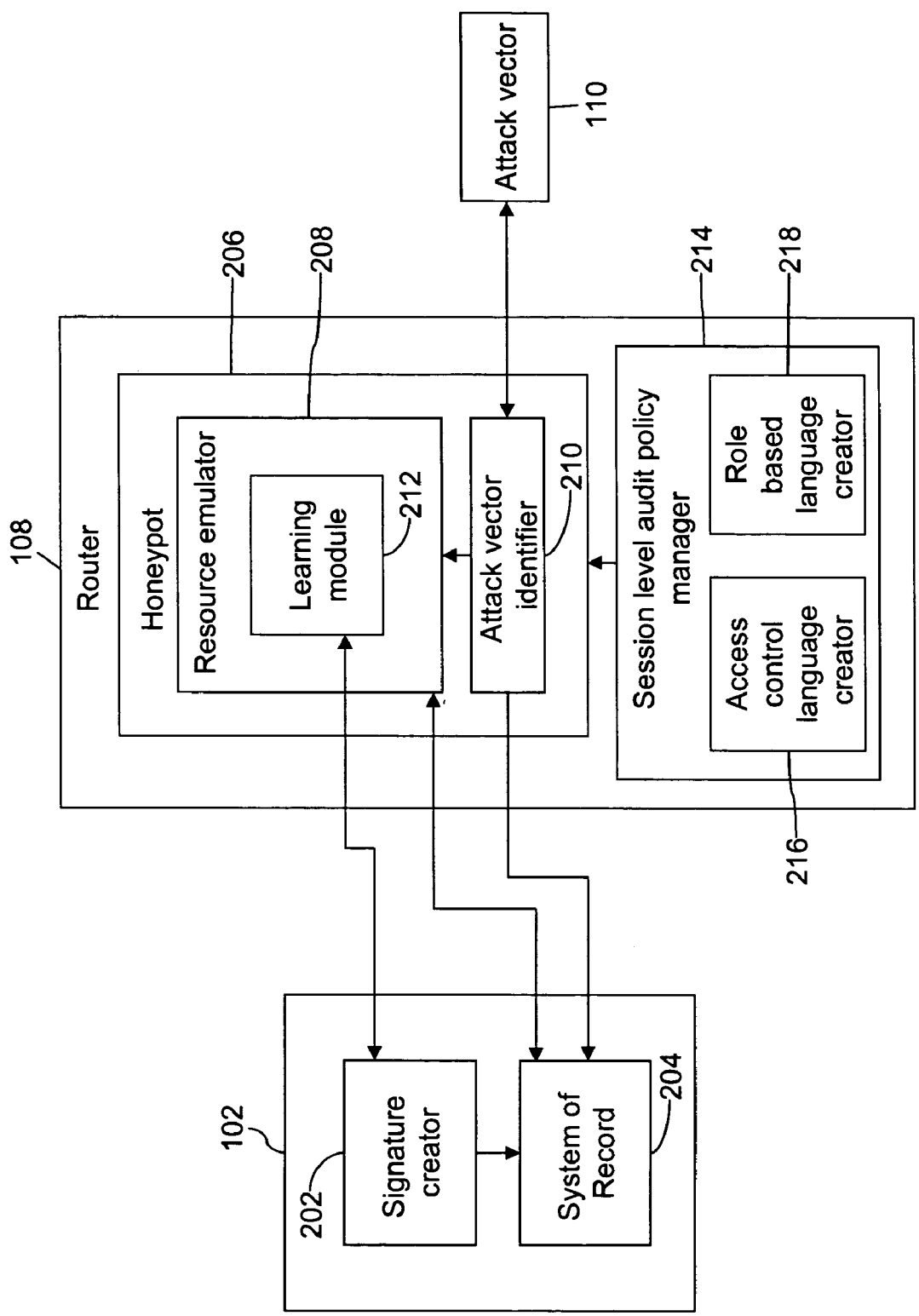
FIG. 2 is a block diagram of a system for preventing, auditing and trending unauthorized traffic in the network system, in accordance with an embodiment of the present invention.

FIG. 2 is a block diagram of a system for preventing, auditing and trending unauthorized traffic in network system 100, in accordance with an exemplary embodiment of the present invention. The system includes network device 102 and router 108. In an embodiment of the invention, network device 102 includes a signature creator 202 and a system of record 204. In another embodiment of the invention, signature creator 202 and system of record 204 can reside in router 108. Router 108 includes a honeypot 206. A honeypot is an information system resource whose value lies in unauthorized or illicit use of the resource. A honeypot is a part of the network system, which is isolated and protected. Any interaction with honeypot indicates unauthorized or malicious activity. In an embodiment of the invention, honeypot 206 can reside within Internet Operating System (IOS) residing in router 108. Honeypot 206 includes a resource emulator 208 and an attack vector identifier 210. Resource emulator 208 also includes a learning engine 212, hereinafter referred to as learning module 212. Signature creator 202 creates signatures for network system resources and services on network device 102. Each signature represents the response of a network system resource and service available on the network device to an attack vector. Examples of network system resources and services include operating system, data files, software applications, printers, and the like. In one embodiment of the invention, a signature represents the response of multiple network system resources and services available on network devices to an attack vector. The signatures are stored in system of record 204. In an embodiment of the invention, system of record 204 may be a database.

Router 108 detects attack vector 110, which is transmitted by attacker 112. Attack vector identifier 210 identifies the type of attack vector 110 by searching system of record 204. If attack vector 110 is identified, resource emulator 208 extracts the signatures of the corresponding network system resources and services available on network device 102 from system of record 204, the signatures being specific to attack vector 110. Resource emulator 208 emulates the specific network system resources and services that attack vector 110 is going to affect, i.e., resource emulator 208 makes a copy of network system resources and services that attack vector 110 is going to affect. Attack vector 110 is then directed to the copy of network system resources and services, thereby protecting network system resources and services. If attack vector 110 is not identified, learning module 212 is initiated. In one embodiment of the invention, learning module 212 understands how attack vector 110 is occurring within network system 100. This is performed by emulating all the network system resources and services on network device 102, if the type of attack vector 110 is not identified. Further, learning module 212 determines which network system resource is being attacked and how attack vector 110 is collecting information. Depending on the understanding of the attack, learning module 212 generates a new signature that corresponds to attack vector 110.

In one embodiment of the invention, router 108 also includes a session level audit policy manager 214. Session level audit policy manager 214 performs the function of auditing. Auditing is essentially collecting and analyzing information about the network traffic to detect security vulnerabilities on the network system. For example, auditing involves protocol analysis, log-on information, tracking changes that occur during a session, and the like.

Session level audit policy manager 214 includes an access control language creator 216 and a role based language creator 218. Access control language creator 216 creates an audit policy based on session variables. Examples of session variables include, but are not limited to, IP number, packet header information, MAC address, authentication and authorization information, time of day, application type, port, and device. Role based language creator 218 creates an audit policy based on session identifiers. Examples of session identifiers include, but are not limited to, user host, authentication information, certificate authority information, and control revocation list information. The audit policy thus created is used to monitor and analyze the network traffic. In an embodiment of the invention, application program interfaces are used for recording network traffic information.

One of the possible uses of embodiments of the invention from the audit policy standpoint is the ability to re-create an attack after the fact. Through intelligent logging of what signatures are being provided based on the user inputs, embodiments of the invention can quickly re-create an attack session. A possible output of the audit would be a network traffic log which could be read by a network sniffer application for analysis. From that log one could see who did what to compromise the system being attacked—the first step in providing a patch. Without embodiments of the invention, the system administrator is only left with "clues" (e.g., syslog events, corrupted server from the attack, etc) based on what limited information is available after the fact. Embodiments of the present invention allow the capturing of what has actually happened, including identifying the particular attacker.

In an embodiment of the invention, honeypot 206, and session level audit policy manager 214 can be integrated with network device 102. In various embodiments of the invention, system elements such as resource emulator 208, learning module 212, access control language creator 216, role based language creator 218, and signature creator 202 can be implemented as hardware modules, software modules, and their combinations thereof.

In another embodiment of the invention, the system also includes application program interface modules to trigger learning module 212 and to update system of record 204.

Figure 3:
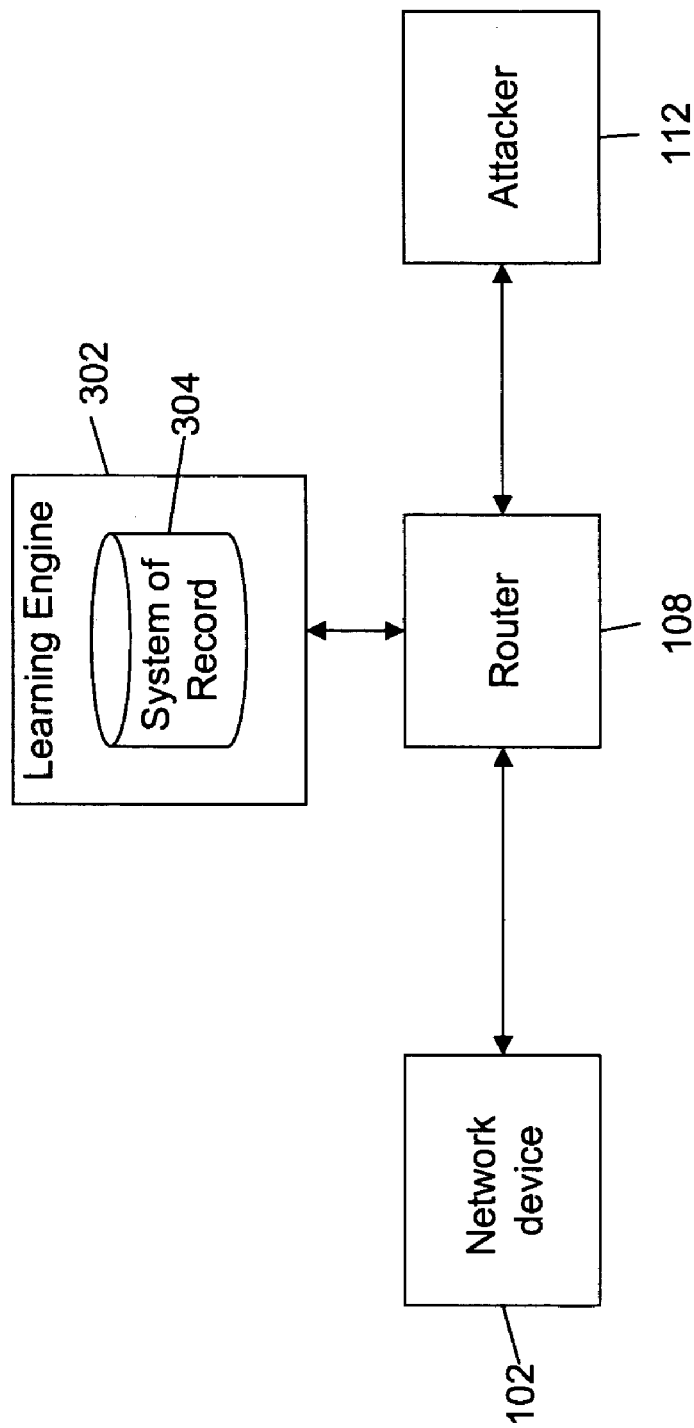
FIG. 3 is a block diagram of a system for preventing, auditing and trending unauthorized traffic in the network system, in accordance with another embodiment of the present invention.

FIG. 3 is a block diagram of a system for preventing unauthorized traffic in a network system, in accordance with an exemplary embodiment of the present invention. The system includes a learning engine 302, which also includes a system of record 304. In one embodiment of the invention, learning engine 302 resides within router 108. Attacker 112 transmits an attack vector. Router 108 transmits the attack vector to learning engine 302. Learning engine 302 emulates the network system resources and services available on network device 102. In an embodiment of the invention, learning engine 302 emulates the network system resources and services that are affected by the attack vectors. In one embodiment of the invention, learning engine 302 can emulate the network system resources and services available on multiple network devices connected to router 108. Further, learning engine 302 studies what attacker 112 is looking for; the manner in which attack vector 110 is requesting information, and its methodology in exploiting network system resources and services. This is referred to as trending the attack vector. Depending on the learning, learning engine 302 creates a signature that represents the response of network system resources to attack vector 110. A method for creating signatures is explained in conjugation with FIG. 4. System of record 304 stores the signatures of network system resources and services available on network device 102. The signatures are then used to emulate the required network system resources and services, if the same attack vector is transmitted again. In an embodiment of the invention, learning engine 302 includes resource emulator 208 and signature creator 202 as described in conjunction with FIG. 2.

Figure 4:
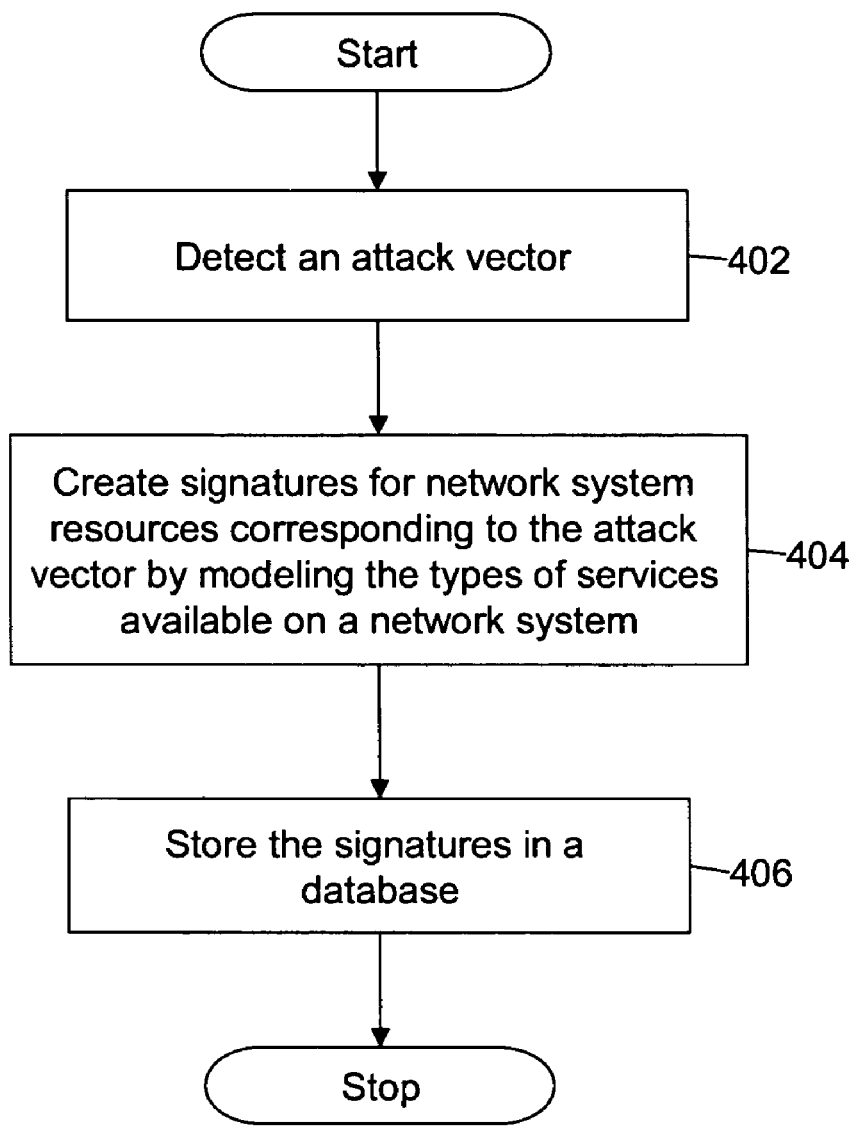
FIG. 4 is a flowchart illustrating a method for creating signatures for network system resources, in accordance with an exemplary embodiment of the present invention.

FIG. 4 is a flowchart illustrating a method for creating signatures for network system resources, in accordance with an exemplary embodiment of the present invention. At step 402, an attack vector is detected by a honeypot, and the type of the attack vector is identified. In one embodiment of the invention, a honeypot is triggered to intercept an attack vector by an outside network device, router or administrator. At step 404, signatures of the network system resources on network devices are created, corresponding to the attack vector, i.e., signatures are created for the network system resources the attack vector is going to affect.

Each signature represents the response of the network system resource to the attack vector, for example, if the attack vector attacks the FTP login level of an operating system running an FTP server, the signature corresponding to the attack vector represents the behavior of the FTP server at the login level. In one embodiment of the invention, a signature represents the response of the network system resource installed on multiple network devices to the attack vector. Thereafter, at step 406, the signatures are stored in a system of record, and are then utilized for emulating the required network system resources, which the attack vector is going to affect.

The signatures are created by modeling the types of services available on the network device. Various steps carried out for modeling the types of the services available on the network device are explained in conjugation with FIG. 5. In an embodiment of the invention, the signatures are created on initial setup of the router. Further, an administrator can configure the signatures to run at specific times, so as to keep the signature updated with the changing network environment.

Figure 5:
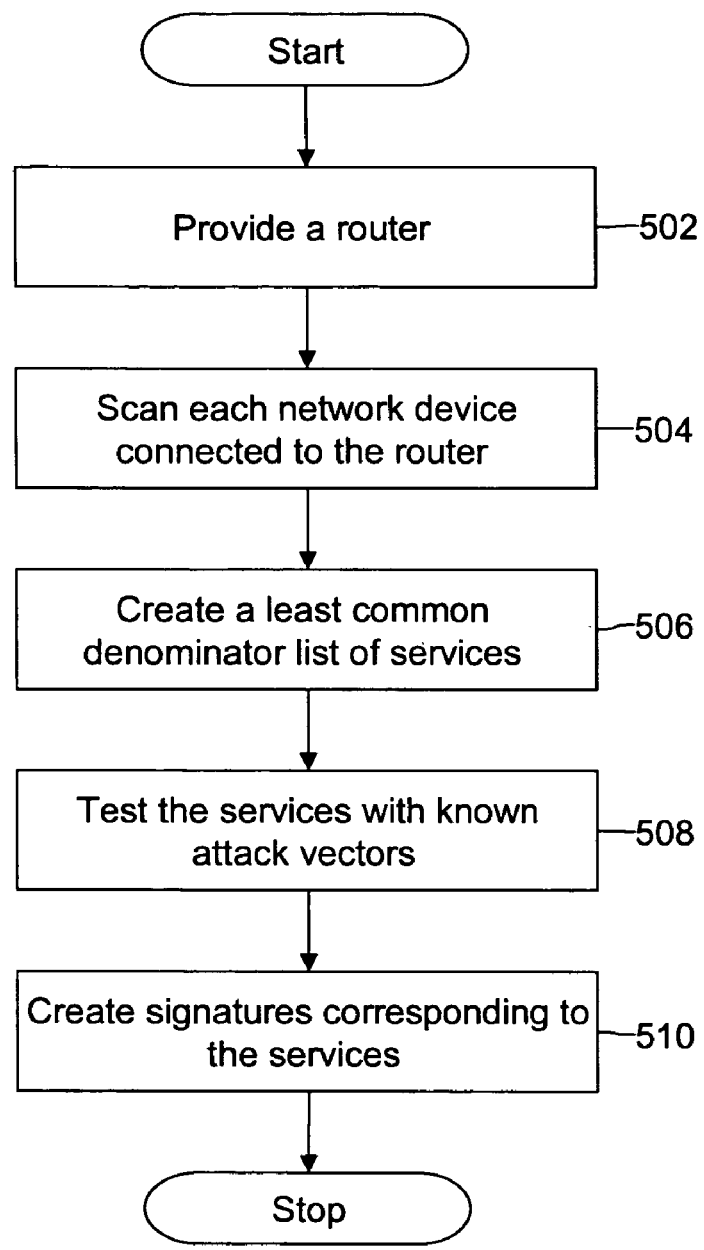
FIG. 5 is a flowchart illustrating a method for modeling the types of services available on the network system, in accordance with an exemplary embodiment of the present invention.

FIG. 5 is a flowchart illustrating various steps carried out for modeling the services available on a network device, in accordance with an exemplary embodiment of the invention. At step 502, a router is provided. At step 504, a honeypot on the router scans each network device connected to the router. Scanning is performed to identify the services available on each of the network devices. Thereafter, at step 506, a least common denominator list of services is created. At step 508, the identified services from the list are queried or tested with known attack vectors. The response of the network devices to each attack vector is studied and at step 510, a signature is created. The signature represents the response of the network device to an attack vector.

Figure 6:
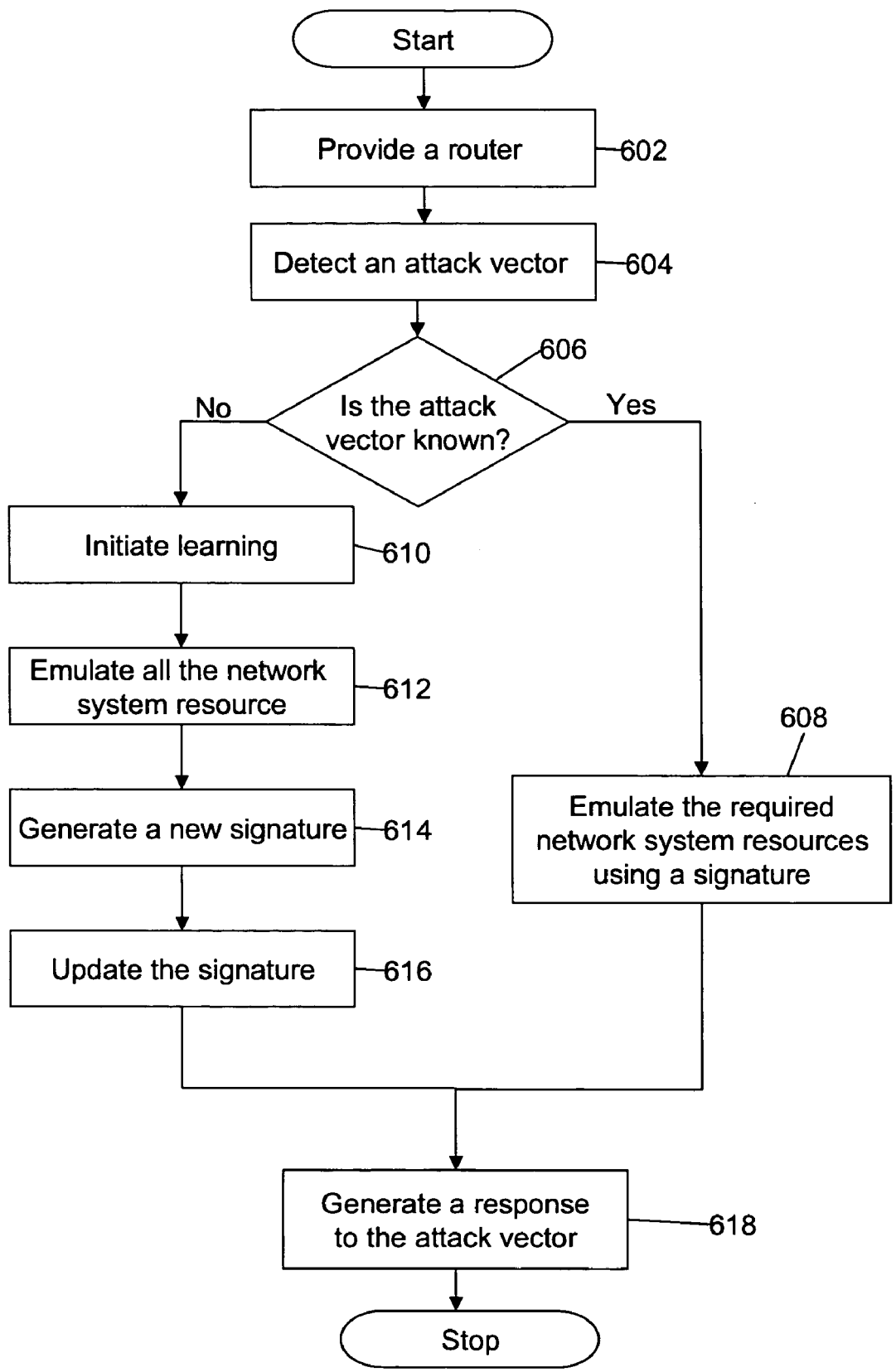
FIG. 6 is a flowchart illustrating a method for preventing unauthorized traffic in the network system, in accordance with an exemplary embodiment of the present invention.

FIG. 6 is a flowchart illustrating a method for preventing unauthorized traffic in a network system, in accordance with an exemplary embodiment of the present invention. A router is provided at step 602 and an attack vector transmitted by an attacker is detected at step 604. At step 606, the system of record of signatures is searched for a signature corresponding to the attack vector, to identify the type of attack vector. The type of attack vector determines the network system resources and services the attack vector is going to affect. If the type of attack vector is known, at step 608, the required network system resources are emulated by using the signatures corresponding to the attack vector, for example, if the attack vector attacks the FTP login level of an operating system running an FTP server, only a FTP login is emulated. Therefore, the attacker cannot access the FTP server and the operating system. Further, at step 618, the emulated network system resources generate a response to the attack probe, thereby protecting network system resources.

It is to be understood that in the case of FTP initial login process, the signature for a given device would contain the authentication string (text) of the banner requesting the user to identify themselves. Additional response data or strings depending on the user input (user id) provided. In the case of FTP, the next action could be to prompt the user for a password. Again based on the user response (known user/password) combination the ftp prompt may be presented, and so forth. For auditing purposes, the session information (source/destination and signatures exercised/generated) could be used to identify new attack methods. Additionally, a hierarchical resource mapping of the network resources themselves (e.g., 12 ftp servers identified at version 15.2, 3 ftp servers at version 12.1) may be used by the system administrator to audit the network based on what is actually running. In other words, we would create a high level mapping of services we identify on the network. In order to reduce overhead, replication of signatures a mapping of multiple hosts to a given signature (ftp server at version 15.2) may be employed. This provides a benefit of reduced overhead (only one copy of the ftp version 15.2 login banner) as well as provides the administrator insight into what resources and version are on that network. A lowest or least common denominator may be generated such that a virtualized host in a sentry mode network (described hereinafter), could provide the services of the ftp server running at version 15.2 without relying on a specific host to learn that behavior/signature.

Continuing to refer to FIG. 6, if the type of attack vector is unknown, then the learning mode is initiated at step 610. In one embodiment of the invention, a system administrator initiates the learning mode. In another embodiment of the invention, the learning mode is initiated by a network firewall. Thereafter, at step 612, all the network system resources and services, regardless of the type of network device on which they are running, are emulated. At step 614, learning engine 302 understands how the attack vector is occurring within the network system, i.e., which network resources the attack vector is attacking, how the attack vector is requesting information, etc. Depending on the learning, a new signature corresponding to the attack vector and the affected network system resources is created. In one embodiment of the invention, learning engine 302 records the complete interaction between the attacker and the emulated network system resources. This interaction is then analyzed to understand how the attack is taking place within the network system. Thereafter, the new signature is updated into the system of record at step 616. At step 618, a response is generated to the attack vector by using the new signature.

In another embodiment of the invention, the learning mode is initiated, irrespective of whether the type of attack vector is known or not. This is referred to as honeypot operating in a proxy mode. Proxy mode is used in two different scenarios. The first is when there are no available addresses in the subnet. Proxy mode will watch for illicit activity on the subnet. At first sign of detection Proxy Mode will assume the end nodes identity and interact with the attack vector directly. This is done by having Proxy Mode playback pre-recorded responses in its system of record to the attack vectors requests. The second is as a triggered event. Proxy Mode can be enabled manually, or triggered by an outside device through Application Program Interface (API). The purposes for the triggering would be to audit a session, gain new signatures and/or commence to session playback. An example of proxy mode is a one to one protection. Assume that there are 10 servers on the network and 10 virtualized hosts are provided using signatures gathered from the original 10, when activated embodiments of the invention will take over an existing session (or future session) on behalf of the original host and respond based on signatures. New signatures may be generated on demand the invention is configured to do so. New signatures could be created either by the invention establishing a connection to the protected host, or by passive learning via a monitored session between the host and the attacker.

In another embodiment of the invention, a router can have multiple subnets in its memory. Each subnet contains an IP address of the network device to which a data packet is to be transmitted. Sometimes, all the addresses in a subnet are not utilized. Therefore, in order to utilize the unused addresses, and/or subnets, in the router, all the network devices are emulated along with the network system resources and services. Further, the IP addresses of the emulated network devices are included in the unutilized subnets in the router. In order to limit the exposure of the network system, in the event of a detected attack vector, the router directs the attack vector to the emulated network devices. Thus, by utilizing the unused addresses and/or subnets, the network device is protected. This is referred to as honeypot operating in a sentry mode. In one embodiment of the invention, the addresses are assigned to the emulated network devices by using Dynamic Host Configuration Protocol (DHCP).

Sentry Mode is mainly used through address fulfillment. If there are empty address spaces within a subnet that the Honey Pot is responsible for then Sentry Mode will be used to occupy all the empty address spaces within a subnet. By doing this, Sentry Mode can act as an end node and wait for attack vectors to come to it. This means that all subnets would appear full at any given time. To an attacker it would appear to be a target rich environment. But, the difference being there are Sentries out there ready to record, interact and audit the attackers session. Examples of sentry mode configurations include one to many protection. Assuming that there are 10 servers on the network and 100 virtualized hosts are provided using signatures gathered from the original 10 repeated 10 times, for a virtualized subnet an entire network A would exist and 10 virtual networks would be provided based on signatures gathered from each hosts available in network A.

In another embodiment of the invention, if the attack is a Denial of Service (DOS) attack, a system administrator indicates to the router that a network device or port on the network device is 'fail closed', to protect the network device from the attack. A DOS attack can be defined as a method of attacking a network device by sending a high volume of requests over the network system or any illicit action taken against a network device that causes its resources, or services, from ceasing to operate. This can slow down the performance of the network device, so that it is unavailable for any traffic. A 'fail closed' scenario makes the network device completely inaccessible, i.e., the network device rejects every packet transmitted to it. In this case, the learning mode is initiated and a corresponding signature is generated, thereby avoiding the 'fail closed' scenario.

Figure 7:
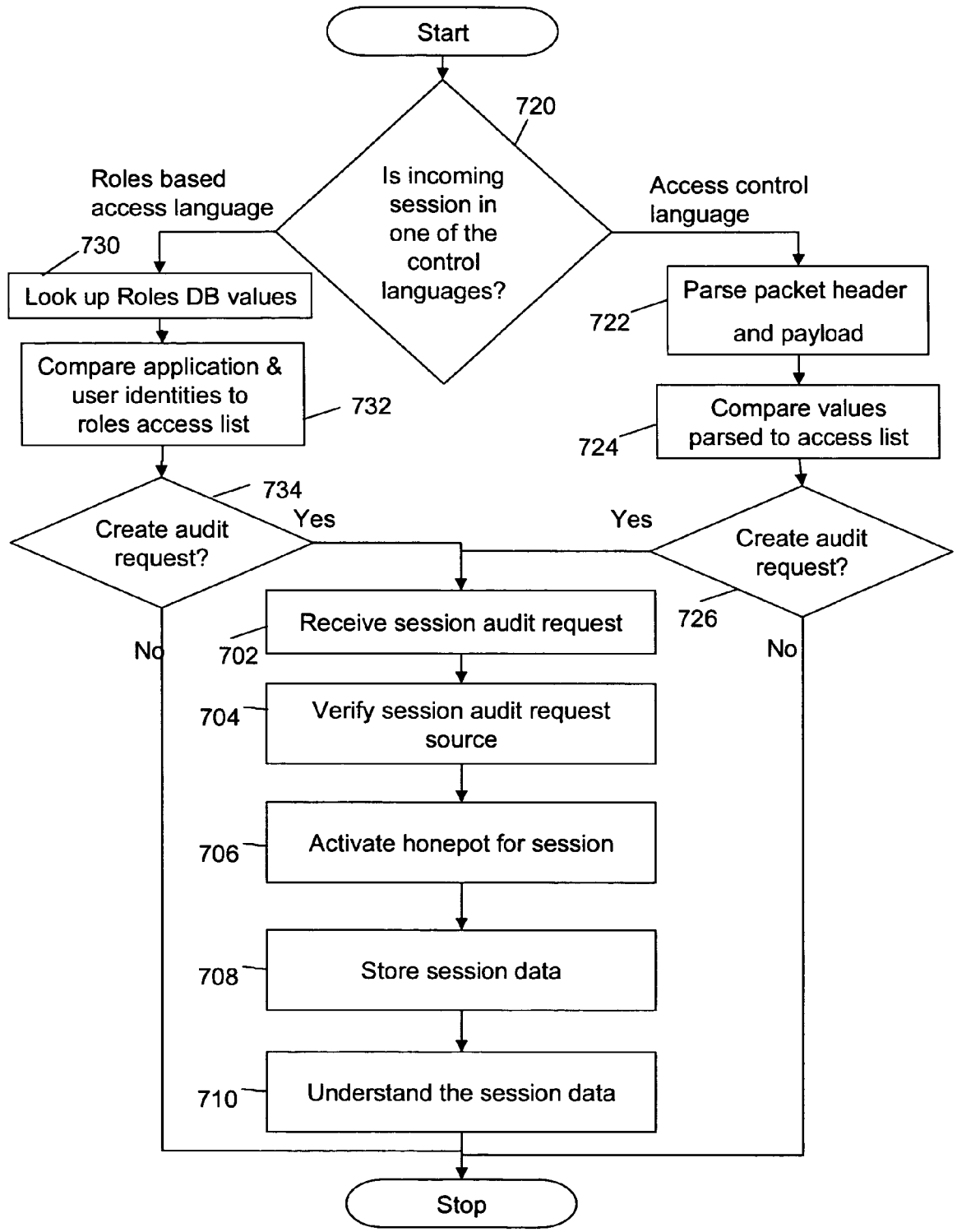
FIG. 7 is a flowchart illustrating a method for auditing network traffic in a network system, in accordance with an exemplary embodiment of the present invention.

FIG. 7 is flowchart illustrating a method for auditing network traffic, in accordance with one embodiment of the invention. At step 720, a determination is made as to the language, more specifically as to access control language (e.g., permit ip 192.168.1.0 0.0.0.255 any, permit all network devices on the 192.168.0.0/24 subnet access to our network) or roles based access language (e.g., all employees in the finance department have access to this network). If the incoming language is access based language, then step 722 (i.e., parse packet header and payload) and step 724 (i.e., compare parsed to access list) are executed, followed by a determination to create an audit request in accordance with step 726. If the incoming language is role based language, then step 730 (i.e., look up roles data base values) and step 732 (i.e., compare application and user identities to roles access list) are executed, followed by a determination to create an audit request in accordance with step 734. If there is a violation detected based on the Access/Role based languages (e.g., network device outside 192.168.0.0/24 is attempting access, or employee from development is attempting access), the audit policy takes over session using proxy mode.

Continuing to refer to FIG. 7, session level auditing of the network traffic is performed to identify security vulnerabilities on the network system and check for potential methods that an intruder might use to attack the network system resources. At step 702, a network device or router makes a session level audit request through an application program interface. At step 704, the source of the request is verified. Thereafter, at step 706, honeypot is activated (e.g., by access control language) to collect information about various session variables such as IP number, MAC address, TCP window size, TCP flags, port, type of application and the like. At step 708, the information is stored in a separate facility such as a hard disk of a network device, which has requested for the session audit. At step 710, this information is used to identify possible security holes in the network system. Further, information regarding session variables is also used to identify probable network probes that attack the network system. For example, TCP flags are used by BOGUS flag probe. In another embodiment of the invention, a role-based language activates honeypot to collect information about various session identifiers such as user host, authentication information, control revocation list information, and the like. This information is used to track the changes made by the user during the session. In one embodiment of the invention, a network administrator activates the session level auditing.

Figure 8:
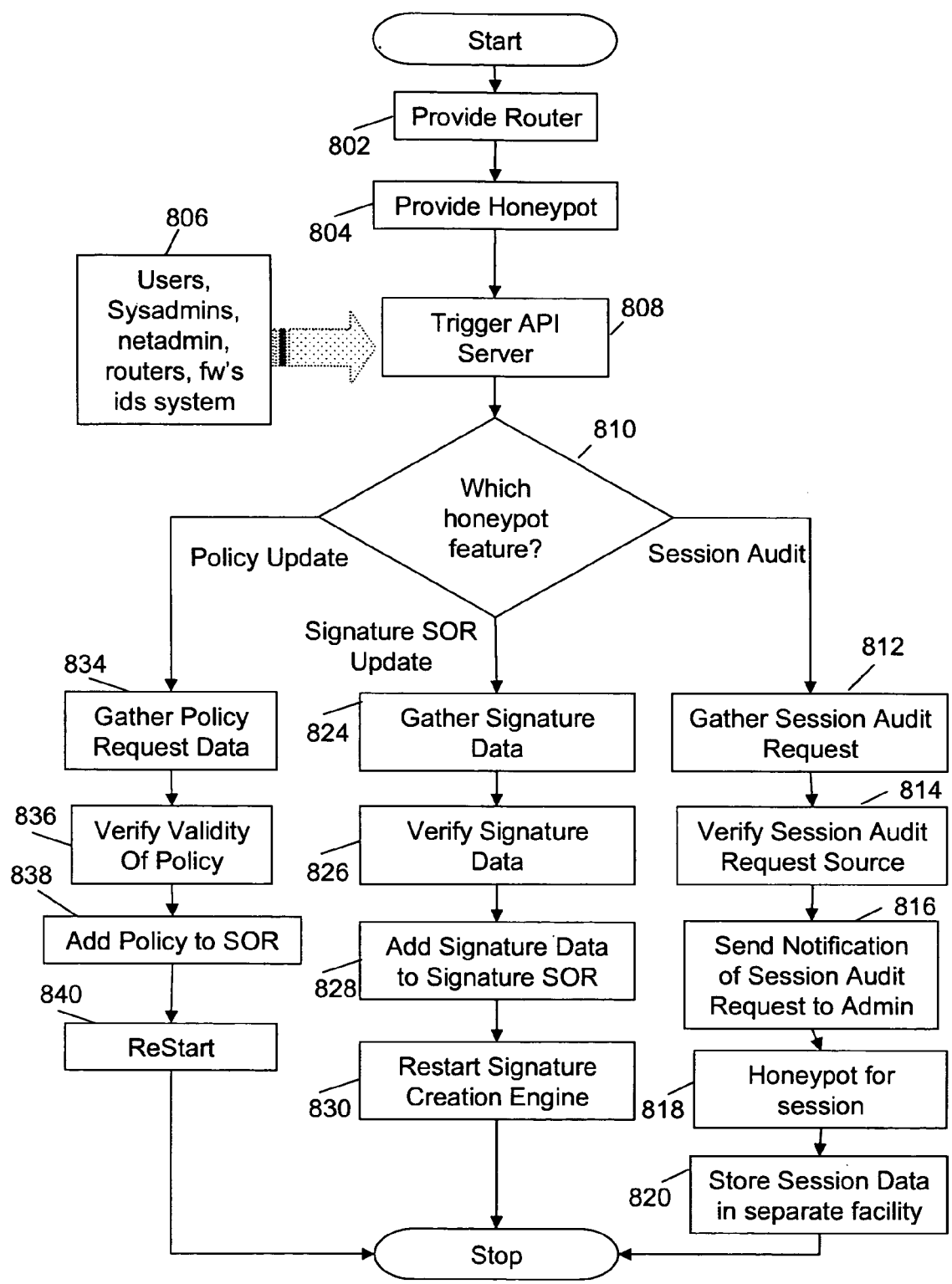
FIG. 8 is a flow diagram illustrating a method for preventing, auditing and trending unauthorized traffic in the network system, in accordance with an embodiment of the present invention.

The above-mentioned methods for preventing, auditing and trending network traffic is further illustrated by using a flow diagram in FIG. 8. The flow diagram, generally illustrated as 800, illustrates exemplary process steps that can be taken in case of session audit, policy update and update of signature system of record (SOR). The process is initiated once the router and the honeypot are provided in accordance with steps 802 and 804, respectively. Each of session audit, policy update and signature update can be triggered by step 806 (e.g., users, sysadmins, netadmin, routers, fw's, ids system, etc.) via an application program interface (API) trigger at step 808. A determination is made at step 810 as to which honeypot feature to employ. If session audit is employed, the following steps are executed: step 812 (gather session audit request); step 814 (verify session audit request source); step 816 (send notification of session audit request to admin); step 818 (honeypot for session); and step 820 (store session data in separate facility). If signature SOR update is employed, the following steps are executed: step 824 (gather signature data); step 826 (verify signature data); step 828 (add signature data to signature SOR); and step 830 (restart signature creation engine). If policy update is employed, the following steps are executed: step 834 (gather policy request data); step 836 (verify validity of policy); step 838 (add policy to SOR); and step 840 (restart).

Embodiments of the present invention have the advantage that the capability of As described earlier in association with FIG. 7, session audit is performed by gather the request for the same, verifying the source of the request, and activating the honeypot for the audit session by notifying the honeypot administrator. Further, the data collected during the auditing is stored and used to identify possible security holes in the network system.

Update of signature SOR includes initiation of learning mode to learn an unknown type of attack vector. This involves gathering data that can be used to generate a signature for the attack vector, verifying the gathered data, adding the same to the signature SOR. The signature creator 202 can then be restarted.

In case of policy update, the audit policy request data is gathered via access control language creator 216 and role based language creator 218. The gathered data is verified and added to the SOR. The policy creators, i.e., access control language creator 216 and role based language creator 218 can then be restarted.

Embodiments of the present invention have the advantage of the capability of the honeypot being integrated into the router. Hence, unauthorized traffic is detected and taken care of at the router level, thereby protecting the network devices. Due to the use of signatures, only the required network system resources are emulated. Further, if the attack vector probes into the honeypot, it receives those signatures the resource or service it is emulating would display. Hence, other resources and services are protected. The learning mode helps in understanding the behavior of an unknown attack vector, and at the same time protects the network devices. Moreover, multiple services and resources of all the ports of a network device are learned by one system. Further, the learning mode provides full auditing capabilities pertaining to an attack vector, for the purpose of investigatory and root cause analysis.

The attack vector is detected at the router level. Therefore, it is not necessary to communicate over the network system to respond to the attack vector. A honeypot can be placed on any network, and it can also be integrated into an overall Intrusion Detection System (IDS) on the router.

Although the invention has been discussed with respect to specific embodiments thereof, these embodiments are merely illustrative, and not restrictive, of the invention, for example, a 'method for preventing, auditing and trending unauthorized traffic in a network system' can include any type of analysis, manual or automatic, to anticipate the needs of the method.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images.

A 'computer readable medium' for purposes of embodiments of the present invention may be any medium that can contain and store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
   detecting an attack vector using a honeypot, wherein the honeypot includes a resource emulator and an attack vector identifier;
   based on a condition of detecting the attack vector, searching a system of record with the attack vector identifier to identify a type of attack vector for the detected attack vector;
   based on a condition that the type of attack vector is identified in the system of record,
      extracting signatures from a storage unit using the honeypot, wherein each signature represents a behavior of a network system resource in response to the attack vector;
      making a copy of network system resources and services that the attack vector will affect; and
      directing the attack vector to the copy of the network resources and services; and
   based on a condition that the type of attack vector is not identified in the system of record, emulating the network system resources using the honeypot to understand the attack vector, wherein the emulating of the network system resources is based on the signatures.

2. The method of claim 1 further comprising determining a manner in which the attack vector requests information.

3. The method of claim 1 wherein creating the signatures further comprises modeling the types of services available on the network system.

4. The method of claim 1, further comprising:
   determining if the honeypot is part of a router in the network system;
   based upon the honeypot being detected as part of the router, emulating the network system resources to understand how the attack vector affects the router and to learn how the attack vector occurs within the network system.

5. The method of claim 1 further comprising providing an application program interface module to learn how the attack vector occurs within the network system.

6. The method of claim 1 further comprising providing an application program interface module for updating the signatures for the network system resources.

7. The method of claim 1 further comprising, based on the condition that the type of attack vector is not identified in the system of record, learning how the attack vector is occurring within the network system.

8. The method of claim 7 further comprising updating the signatures for the network system resources.

9. A system comprising:
   a router that detects an attack vector using a honeypot, wherein the honeypot includes a resource emulator and an attack vector identifier, wherein the attack vector identifier is configured for at least identifying a type of attack vector for the attack vector;
   a signature creator for creating signatures for network system resources, wherein each signature represents the behavior of a network system resource to the attack vector; and
   a storage system for storing the signatures for network system resources,
   wherein the resource emulator is configured to extract signatures from the storage system,
   wherein based upon a condition that the attack vector identifier is able to identify the type of attack vector, the resource emulator is configured to generate a copy of network system resources and services that the attack vector will affect,
   wherein based upon a condition that the attack vector identifier is unable to identify the type of attack vector, the resource emulator is configured to emulate the network system resources to understand the attack vector that the router detected, and
   wherein the emulating of the network system resources is based on the signatures.

10. The system of claim 9 further comprising a session level audit policy manager for auditing the unauthorized network traffic.

11. A computer system comprising:
   means for detecting an attack vector using a honeypot, wherein the honeypot includes a resource emulator and an attack vector identifier, wherein the attack vector identifier is configured for at least identifying a type of attack vector for the attack vector;
   means for extracting signatures from a storage unit using the honeypot, wherein each signature represents a behavior of a network system resource to the attack vector;
   based upon a condition that the attack vector identifier is able to identify the type of attack vector, means for generating a copy of network system resources and services that the attack vector will affect; and
   based upon a condition that the attack vector identifier is unable to identify the type of attack vector, means for emulating the network system resources and services via using the honeypot to understand the attack vector, wherein the emulating of the network system resources is based on the signatures.

12. A computer system comprising:
   a computer coupled to the router having a honeypot including an adaptive service learning software module for:

detecting an attack vector using a honeypot, wherein the honeypot includes a resource emulator and an attack vector identifier;

based on a condition of detecting the attack vector, searching a system of record with the attack vector identifier to identify a type of attack vector for the detected attack vector;

based on a condition that the type of attack vector is identified in the system of record,
- extracting signatures from a storage unit using the honeypot, wherein each signature represents a behavior of a network system resource in response to the attack vector;
- making a copy of network system resources and services that the attack vector will affect; and
- directing the attack vector to the copy of the network resources and services; and based on a condition that the type of attack vector is not identified in the system of record, emulating the network system resources using the honeypot to understand the attack vector, wherein the emulating of the network system resources is based on the signatures.

13. A router comprising:

an adaptive service learning module disposed in the router for:
- detecting an attack vector using a honeypot, wherein the honeypot includes a resource emulator and an attack vector identifier;
- based on a condition of detecting the attack vector, searching a system of record with the attack vector identifier to identify a type of attack vector for the detected attack vector;
- based on a condition that the type of attack vector is identified in the system of record,
  - extracting signatures from a storage unit using the honeypot, wherein each signature represents a behavior of a network system resource in response to the attack vector;
  - making a copy of network system resources and services that the attack vector will affect; and
  - directing the attack vector to the copy of the network resources and services; and
- based on a condition that the type of attack vector is not identified in the system of record, emulating the network system resources using the honeypot to understand the attack vector, wherein the emulating of the network system resources is based on the signatures.

14. An apparatus comprising:

a processing system including a processor coupled to a display and user input device; and a machine-readable medium tangibly including instructions executable by the processor, the machine-readable medium comprising one or more instructions to cause the processing system to perform operations comprising:
- detecting an attack vector using a honeypot, wherein the honeypot includes a resource emulator and an attack vector identifier;
  - based on a condition of detecting the attack vector, searching a system of record with the attack vector identifier to identify a type of attack vector for the detected attack vector;
  - based on a condition that the type of attack vector is identified in the system of record,
    - extracting signatures from a storage unit using the honeypot, wherein each signature represents a behavior of a network system resource in response to the attack vector;
    - making a copy of network system resources and services that the attack vector will affect; and
    - directing the attack vector to the copy of the network resources and services; and
  - based on a condition that the type of attack vector is not identified in the system of record, emulating the network system resources using the honeypot to understand the attack vector, wherein the emulating of the network system resources is based on the signatures.

15. A machine-readable storage medium tangibly including instructions executable by one or more processors, the one or more instructions to cause the one or more processors to perform operations comprising:
- detecting an attack vector using a honeypot, wherein the honeypot includes a resource emulator and an attack vector identifier;
  - based on a condition of detecting the attack vector, searching a system of record with the attack vector identifier to identify a type of attack vector for the detected attack vector;
  - based on a condition that the type of attack vector is identified in the system of record,
    extracting signatures from a storage unit using the honeypot, wherein each signature represents a behavior of a network system resource in response to the attack vector;
    making a copy of network system resources and services that the attack vector will affect; and
    directing the attack vector to the copy of the network resources and services; and
- based on a condition that the type of attack vector is not identified in the system of record, emulating the network system resources using the honeypot to understand the attack vector, wherein the emulating of the network system resources is based on the signatures.

* * * * *